US009298699B2

United States Patent
Killalea et al.

(10) Patent No.: US 9,298,699 B2
(45) Date of Patent: *Mar. 29, 2016

(54) PRESENTATION OF WRITTEN WORKS BASED ON CHARACTER IDENTITIES AND ATTRIBUTES

(71) Applicant: Amazon Technologies, Inc., Reno, NV (US)

(72) Inventors: Peter Thomas Killalea, Seattle, WA (US); Janna S. Hamaker, Seattle, WA (US); Eugene Kalenkovich, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,269

(22) Filed: Aug. 6, 2014

(65) Prior Publication Data

US 2014/0350921 A1 Nov. 27, 2014

Related U.S. Application Data

(63) Continuation of application No. 13/438,541, filed on Apr. 3, 2012, now Pat. No. 8,838,450, which is a continuation of application No. 12/487,136, filed on Jun. 18, 2009, now Pat. No. 8,150,695.

(51) Int. Cl.
| | |
|---|---|
| *G06Q 30/04* | (2012.01) |
| *G10L 13/033* | (2013.01) |
| *G10L 13/08* | (2013.01) |
| *G06F 17/27* | (2006.01) |

(52) U.S. Cl.
CPC ............ *G06F 17/2765* (2013.01); *G06Q 30/04* (2013.01); *G10L 13/033* (2013.01); *G10L 13/08* (2013.01); *G06F 17/278* (2013.01)

(58) Field of Classification Search
CPC ... G06F 17/27; G06F 17/278; G10L 13/0335; G10L 13/08
See application file for complete search history.

(56) References Cited

U.S. PATENT DOCUMENTS

| | | |
|---|---|---|
| 5,604,855 A | 2/1997 | Crawford |
| 5,842,167 A | 11/1998 | Miyatake et al. |
| 5,970,455 A | 10/1999 | Wilcox et al. |
| 5,995,935 A | 11/1999 | Hagiwara et al. |
| 6,006,188 A | 12/1999 | Bogdashevsky et al. |
| 6,249,720 B1 | 6/2001 | Kubota et al. |
| 6,513,011 B1 * | 1/2003 | Uwakubo ..................... 704/275 |
| 6,557,026 B1 | 4/2003 | Stephens, Jr. |
| 6,813,605 B2 | 11/2004 | Nakamura et al. |
| 7,228,273 B2 | 6/2007 | Okunoki |
| 7,454,346 B1 | 11/2008 | Dodrill et al. |

(Continued)

OTHER PUBLICATIONS

U.S. Appl. No. 61/144,947, filed Jan. 15, 2009.*

(Continued)

*Primary Examiner* — Eric Yen
(74) *Attorney, Agent, or Firm* — Lee & Hayes, PLLC (57) ABSTRACT

A method is provided for presenting a written work. A character identity is recognized within a written work. Presentation information for the written work, such as a graphical scheme or an electronic voice, is determined based on the character identity. The presentation information is provided to a user computing device. The user computing device renders the written work or a portion thereof using the presentation information.

21 Claims, 9 Drawing Sheets

(56) References Cited

U.S. PATENT DOCUMENTS

| | | |
|---|---|---|
| 7,523,036 B2 | 4/2009 | Akabane et al. |
| 7,668,718 B2 | 2/2010 | Kahn et al. |
| 7,739,601 B1 | 6/2010 | Wong et al. |
| 7,764,277 B2 | 7/2010 | Klassen et al. |
| 7,944,860 B2 | 5/2011 | Rajagopalan et al. |
| 7,957,976 B2 | 6/2011 | Cross, Jr. et al. |
| 7,966,187 B1 | 6/2011 | Pettay et al. |
| 7,996,436 B2 | 8/2011 | Schneider et al. |
| 8,024,672 B1 | 9/2011 | Skwarecki et al. |
| 8,065,603 B2 | 11/2011 | Gossweiler, III et al. |
| 8,117,553 B2 | 2/2012 | Danninger et al. |
| 8,150,695 B1 | 4/2012 | Killalea et al. |
| 8,225,208 B2 | 7/2012 | Sprang et al. |
| 8,261,177 B2 | 9/2012 | Krishnaswamy et al. |
| 8,326,623 B2 | 12/2012 | Fujii |
| 8,346,557 B2 | 1/2013 | Kurzweil et al. |
| 8,499,243 B2 | 7/2013 | Yuki |
| 8,510,657 B2 | 8/2013 | Gilbert et al. |
| 8,533,623 B2 | 9/2013 | St. Jacques, Jr. |
| 8,539,379 B2 | 9/2013 | Skwarecki et al. |
| 8,559,732 B2 | 10/2013 | Rayner |
| 8,560,971 B2 | 10/2013 | Duquene et al. |
| 8,751,939 B2 | 6/2014 | Law et al. |
| 2002/0087555 A1 | 7/2002 | Murata |
| 2002/0094873 A1 | 7/2002 | Nishino et al. |
| 2002/0161882 A1 | 10/2002 | Chatani |
| 2004/0098266 A1* | 5/2004 | Hughes et al. ........... 704/277 |
| 2005/0096909 A1 | 5/2005 | Bakis et al. |
| 2006/0080084 A1* | 4/2006 | Shuster ................... 704/9 |
| 2006/0161437 A1 | 7/2006 | Akabane et al. |
| 2007/0087797 A1 | 4/2007 | Van Luchene |
| 2007/0118378 A1* | 5/2007 | Skuratovsky ........... 704/260 |
| 2007/0146360 A1 | 6/2007 | Clatworthy et al. |
| 2008/0270119 A1 | 10/2008 | Suzuki |
| 2009/0100454 A1 | 4/2009 | Weber |
| 2010/0324902 A1* | 12/2010 | Kurzweil et al. ........... 704/260 |
| 2012/0196260 A1 | 8/2012 | Nhiayi |
| 2012/0226500 A1 | 9/2012 | Balasubramanian et al. |
| 2012/0304101 A1 | 11/2012 | Dicke |
| 2013/0031503 A1 | 1/2013 | Madhavan et al. |

OTHER PUBLICATIONS

U.S. Appl. No. 12/487,136, filed on Jun. 18, 2009, Tom Killalea et al., "Presentation of Written Works Based on Character Identities and Attributes". 30 Pages.

"Systems and Methods for Selection of Multiple Voices for Document Narration", Specification of U.S. Appl. No. 61/144,947, filed Jan. 15, 2009, 15 Pages.

Folsom, "Turning a Novel Into a Screenplay", WritersDigest.com, retrieved on Jan. 31, 2013, at http:www.writersdigest.com/writing-articles/by-writing-genre/script-writing/turning-a-no, 2008, 3 pages.

Office action for U.S. Appl. No. 12/487,136, mailed on Jun. 9, 2011, Tom Killalea et al., "Presentation of Written Works Based on Character Identities and Attributes", 13 pages.

Office action for U.S. Appl. No. 13/438,541, mailed on Nov. 18, 2013, Killalea, et al., "Presentation of Written Works Based on Character Identities and Attributes", 50 pages.

Office Action for U.S. Appl. No. 13/535,002, mailed on Dec. 19, 2013, Joshua M. Goodspeed, "Visually Distinguishing Portions of Content", 12 pages.

Office action for U.S. Appl. No. 13/438,541, mailed on Feb. 11, 2013, Killalea et al., "Presentation of Written Works Based on Character Identities and Attributes", 31 pages.

Office action for U.S. Appl. No. 13/438,541, mailed on Jul. 3, 2013, Killalea et al., "Presentation of Written Works Based on Character Identities and Attributes", 39 pages.

Office action for U.S. Appl. No. 13/438,541, mailed on Sep. 24, 2012, Killalea et al., "Presentation of Written Works Based on Character Identities and Attributes", 4 pages.

* cited by examiner

PRESENTATION OF WRITTEN WORKS BASED ON CHARACTER IDENTITIES AND ATTRIBUTES

RELATED APPLICATIONS

This application is a continuation of and claims priority to U.S. patent application Ser. No. 13/438,541, filed Apr. 3, 2012, which is a continuation of U.S. patent application Ser. No. 12/487,136, filed Jun. 18, 2009, both of which are incorporated by reference herein.

BACKGROUND

Automated methods for recognizing "named entities" (e.g., persons or places) in a body of text are known. The existing methods have been applied primarily to relatively short works, such as news reports, and highly specialized scientific works such as biomedical texts. Further, these methods have generally been applied to extract and compile information from texts, not to enhance the reading experience.

Written works such as works of fiction often contain a large number of character identities. The character identities and their attributes affect comprehension, interpretation, and understanding of the work and therefore have a profound effect on the reading experience. While most printed copies of written works simply present the work statically in black ink on white paper, the concept of electronic rendering of written works provides an opportunity to customize the presentation of a written work based on the characters within, making the written work more engaging for a user. Existing electronic rendering systems, however, fail to provide such customization.

BRIEF DESCRIPTION OF THE DRAWINGS

Corresponding reference characters indicate corresponding parts throughout the drawings.

DETAILED DESCRIPTION

Disclosed embodiments enable the presentation of a written work based on information related to one or more character identities within the written work. The embodiments are not limited to specific types of written works such as works of fiction or biographies, as other types of written works are also contemplated. Written works include all forms of fiction (e.g., novels, short stories) and non-fiction (e.g., biographies, historical books), including combinations of fiction and non-fiction such as historical fiction.

While the term "character identity" is described in some embodiments herein with reference to a person, the term "character identity" in some embodiments includes any object referenced by the written work. Example character identities include people, personas, narrators, institutions, animals, machines, products, and devices. Character identities may be human, animal, supernatural, mythical, or divine. A written work may personify a thing, a place, or an intangible concept, thereby producing a character identity.

Some embodiments described herein enable an audible presentation of a written work using speech synthesis. Specifically, at least a portion of a written work is audibly rendered by a machine (e.g., an electronic book reader) using one or more electronic "voices". A voice may be defined by information describing audible properties—such as pitch and phonation or "voicing"—to be used by a machine in rendering the voice. Alternatively, or in addition, a voice may be defined by audio samples of an actual person speaking utterances, words, and/or phrases.

A voice may be associated with voice attributes useful for describing the voice to a person such as a user of a computing device. For example, a voice may be associated with a sex, an age, an accent, a pitch, a speed, an ethnicity, a socioeconomic class (e.g., upper class or working class), a tribe, and/or a caste, though other voice attributes are also contemplated. Several types of voices may be available for audibly rendering a written work, including generic voices (e.g., a male adolescent), celebrity voices (e.g., a well-known actor), and custom voices. A user may create a custom voice, for example, by speaking utterances, words, and/or phrases from a script while a machine records the user's speech. The machine may include software for creating a voice based on the recording.

Figure 1:
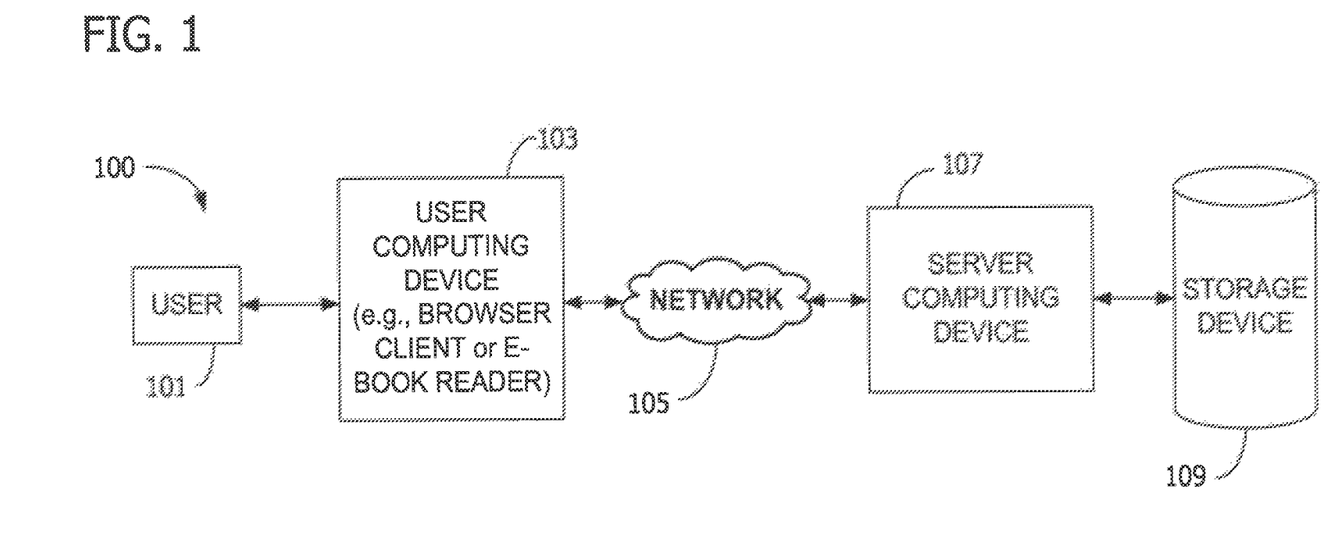
FIG. 1 is a block diagram illustrating an exemplary system according to an embodiment in which a user computing device communicates with a server computing device via a network.

Referring to FIG. 1, a block diagram illustrating an exemplary system 100 is provided. The system 100 utilizes a server computing device 107 to process a written work. A user 101 accesses a user computing device 103 such as a browser client or electronic book reader to view information about the written work presented thereon. Written work information is communicated to the user computing device 103 through a network 105. The network 105 is any type of network that communicatively couples computing devices. Examples of the network 105 include the Internet, a peer to peer (P2P) network, a local area network (LAN), or a wide area network (WAN).

The user computing device 103 is any device capable of accessing the network 105 and presenting character identity information to the user 101. By way of example only, and not limitation, the user computing device 103 may include a laptop, a netbook, a desktop computer, a set-top box, a mobile entertainment device such as a vehicle entertainment system, a handheld device such as an electronic book reader, a cellular phone or smart phone, a mobile internet device, or a video gaming device. An exemplary user computing device 103 is described in detail with respect to FIG. 2 below.

The server computing device 107 is communicatively coupled through the network 105 to the user computing device 103. The server computing device 107 is any type of device that contains a processor operable to execute computer executable instructions and a memory to store and retrieve information. In some embodiments, the server computing device 107 hosts an e-commerce website. An exemplary server computing device 107 is described in detail with respect to FIG. 3 below.

The server computing device 107 is communicatively coupled to a storage device 109, upon which written works and related information (e.g., metadata) are stored. Voice information for use with written works may also be stored on the storage device 109. A written work may be stored as an individual file, as a portion of a file, or as multiple files. The storage device 109 may include a database, in which case a written work and/or the written work's metadata may be stored in the database. The storage device 109 can be any form of computer-readable media, such as a hard disk drive, a solid state disk, or an optical disk drive. In some embodiments, the storage device 109 is integrated with the server computing device 107.

Figure 2:
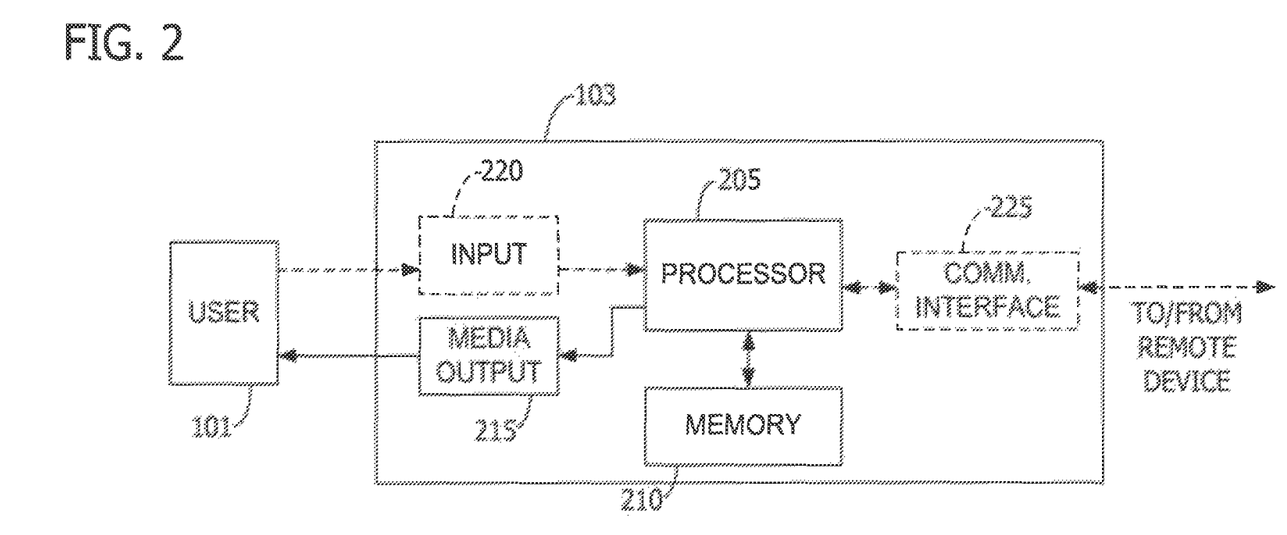
FIG. 2 is a block diagram illustrating an exemplary user computing device.

Referring next to FIG. 2, an exemplary user computing device 103 is illustrated. The user computing device 103 includes a processor 205 for executing instructions. In some embodiments, instructions are stored in a memory area 210. The processor 205 may include one or more processing units (e.g., in a multi-core configuration). The memory area 210 is any device allowing information such as executable instructions and/or written works to be stored and retrieved. The memory area 210 may include one or more computer readable media.

The user computing device 103 also includes at least one media output component 215 for presenting information (e.g., related to a written work) to the user 101. The media output component 215 is any component capable of conveying information to the user 101. In some embodiments, the media output component 215 includes an output adapter such as a video adapter and/or an audio adapter. An output adapter is operatively coupled to the processor 205 and operatively couplable to an output device such as a display device (e.g., a liquid crystal display (LCD), organic light emitting diode (OLED) display, or "electronic ink" display) or an audio output device (e.g., a speaker or headphones). For example, a video adapter may output a video signal using a Digital Visual Interface (DVI), HIGH-DEFINITION MULTIMEDIA INTERFACE (HDMI), and/or DisplayPort connection. An audio adapter may output an analog audio signal (e.g., through a headphone connector or other analog audio jack(s)) or a digital audio signal (e.g., through an optical, coaxial, or HDMI connector). The media output component 215 may include both an output adapter and an output device. In one embodiment, the media output component 215 includes a video adapter coupled to an integrated electronic ink display, which renders text and/or images on a front-lit panel.

In some embodiments, the user computing device 103 includes an input device 220 for receiving input from the user 101. The input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 215 and the input device 220.

The user computing device 103 may also include a communication interface 225, which is communicatively couplable to a remote device such as the server computing device 107. The communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in the memory area 210 are, for example, computer readable instructions for providing a user interface to the user 101 via the media output component 215 and, optionally, receiving and processing input from the input device 220. A user interface may include, among other possibilities, a web browser or an electronic book interface. Web browsers enable users, such as the user 101, to display and interact with media (e.g., the written works) and other information typically embedded on a web page or a website on the server computing device 107. An electronic book interface allows the user 101 to navigate a written work stored in the memory area 210 and render the written work in visible form (e.g., on an electronic ink display) or audible form (e.g., through a text-to-speech feature) using the media output component 215. A user interface may also allow the user 101 to view written works in a catalog and download a written work to the user computing device 103 via the communication interface 225.

In one embodiment, the processor 205 is programmed to retrieve a written work from the memory area 210. The written work includes one or more character identities. For example, the written work may include metadata describing the character identities within the written work. The processor 205 is also programmed to identify one or more portions of the written work corresponding to one of the character identities. For example, the processor 205 may be programmed to retrieve, from the memory area 210 or via the communication interface 225, associations between each character identity and portions of the written work corresponding to that character identity.

The processor 205 is also programmed to obtain presentation information for the identified portions. Presentation information may be obtained from within the written work, from elsewhere in the memory area 210, or via the communication interface 225 (e.g., from a remote device such as the server computing device 107). In some embodiments, the user 101 selects presentation information using the input device 220. The selected presentation information is associated with the written work, with a character identity, and/or with the identified portions and stored in the memory area 210.

The processor 205 is also programmed to present the identified portions using the obtained presentation information via the media output component 215. In some embodiments, the media output component 215 includes an audio adapter, and the presentation information for the identified portions includes a voice for the character identity corresponding to the identified portions. In some embodiments, the media output component 215 includes a video adapter, and the presentation information for the identified portions comprises a graphical scheme for the character identity corresponding to the identified portions.

In some embodiments, the processor 205 is programmed to request a written work from a remote device using the communication interface 225. For example, the processor 205 may transmit a purchase request to the remote device. The processor 205 is also programmed to receive the written work from the remote device using the communication interface 225 and store the received written work in the memory area 210. The processor 205 may be programmed to receive the written work in a "stream" of data. In such an embodiment, the processor 205 receives a portion of the written work via the communication interface 225 and stores the received portion in the memory area 210. The processor 205 is programmed to present the received portion of the written work via the media output component 215, regardless of whether all subsequent portions have been received. For example, a written work may be received in sequential portions through the communication interface 225, and the user 101 may be presented, via the media output component 215, the first of such sequential portions before the remaining portions are received. The user 101 may thus begin enjoying the written work without waiting for the entirety of the written work to be received.

Figure 3:
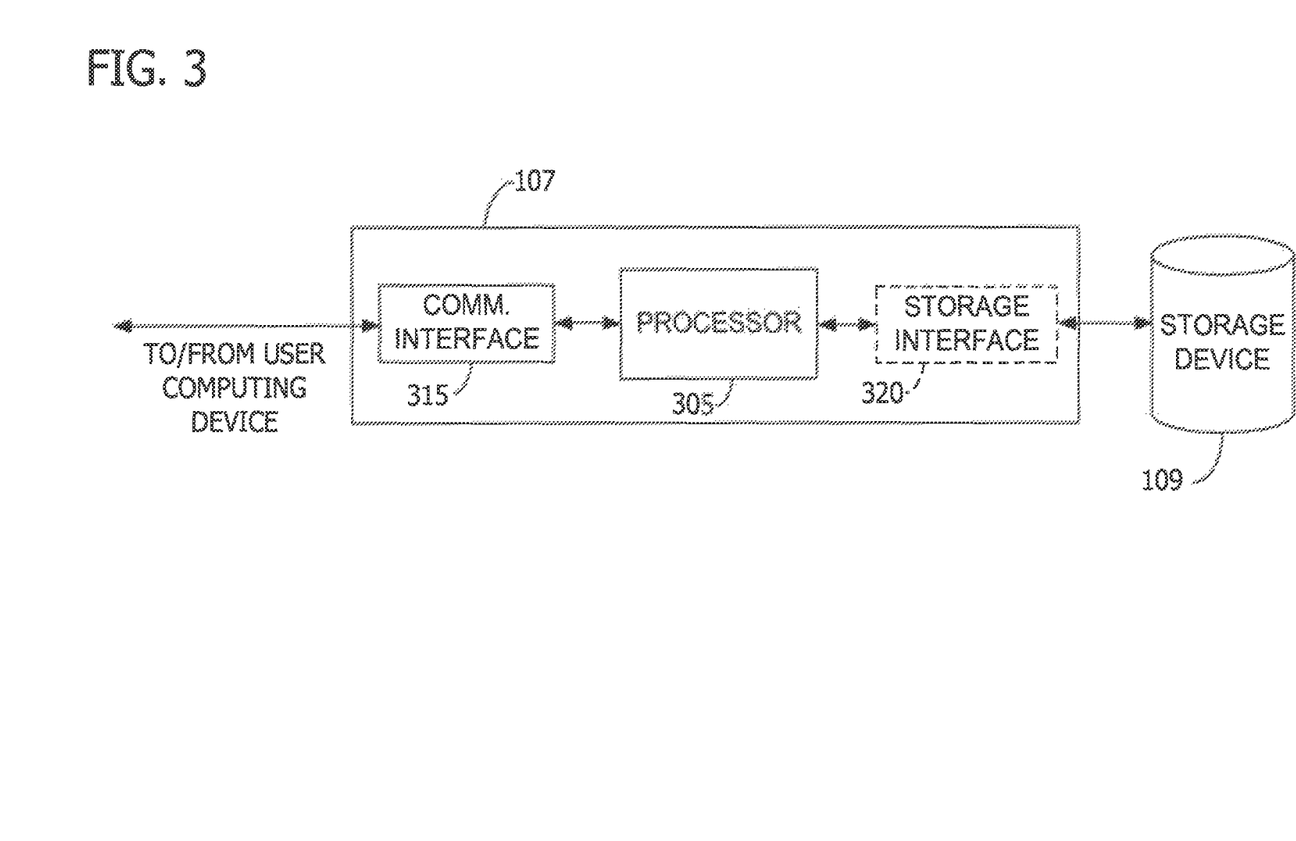
FIG. 3 is a block diagram illustrating an exemplary server computing device.

Referring next to FIG. 3, an exemplary server computing device 107 for providing a written work for audible presentation at a user computing device is provided. The server computing device 107 includes a processor 305 for executing instructions. Instructions may be stored in the storage device 109, for example. The processor 305 may include one or more processing units (e.g., in a multi-core configuration).

The processor 305 is operatively coupled to a communication interface 315 such that the server computing device 107 is capable of communicating with a client device such as the user computing device 103. For example, the communication interface 315 may receive requests from the user computing device 103 via the network 105, as illustrated in FIG. 1.

The processor 305 is also operatively coupled to a storage device 109. The storage device 109 is any form of computer readable media suitable for storing a plurality of voices and one or more written works having at least one character identity. In some embodiments, the storage device 109 is integrated in the server computing device 107. For example, the server computing device may include one or more hard disk drives as the storage device 109.

The processor 305 is programmed to determine within a written work a character identity. Character identities may be determined, for example, using named entity recognition (NER) software such as CRFClassifier from the Natural Language Processing Group at Stanford University or GATE and ANNIE from the Natural Language Processing Group at the University of Sheffield. The NER software detects in the work textual strings (references) which refer to a character (referent). The NER software further identifies "coreferent" references, which share a common referent, and resolves them, such that a single referent is associated with multiple textual strings.

The processor 305 is also programmed to identify one or more portions of the written work associated with the character identity to create one or more character identity-portion associations. Portions of a written work associated with a character identity may be identified in several ways. For example, in many instances, the written work includes quotation marks around words "spoken" by a character identity. The quoted words may be preceded or followed by a reference to a particular character identity (e.g., a name or pronoun indicating the character identity) and possibly a word or phrase indicating speech (e.g., "said", "exclaimed", "replied"). In such instances, the quoted words may be identified and associated with the character identity. In other instances, a character identity reference may simply be followed by punctuation such as a colon and then the words "spoken" by the character, with or without quotation marks. Further, quoted words may appear without a proximate character identity reference. For example, where two character identities exchange dialogue, the written work may include a character identity reference near only some quoted portions (e.g., at the beginning of the exchange). It may generally be assumed that, where no contrary indication exists in the written work, the quoted portions alternate between the two character identities. Words that do not appear to be associated with any character identity may be interpreted as associated with a narrator of the written work.

The processor 305 is also programmed to store the character identity and the character identity-portion associations in the storage device 109. In some embodiments, the storage device 109 includes a database such as a relational, hierarchical, or object oriented database, and the character identities and character-identity-portion associations are stored in the database.

The processor 305 is also programmed to provide the character identity and the character identity-portion associations from the storage device 109 to a user computing device (e.g., the user computing device 103) via the communication interface 315. For example, the processor 305 may transmit the character identity and the character identity-portion associations to a user computing device as part of an electronic book. The processor 305 may also provide the character identity and character identity-portions in a separate transmission, upon receiving a request from the user computing device 103.

The processor 305 is further programmed to provide a catalog having a plurality of voices from the storage device 109 to the user computing device via the communication interface 315. The catalog may list all voices available from the storage device 109, may list only voices determined to be appropriate for a particular written work or a particular character identity, or may list all voices available but indicate a subset of voices that are suggested or appropriate for a particular written work or a particular character identity.

For example, the processor 305 may be programmed to recognize at least one character identity attribute for a character identity and provide a voice suggestion to the user computing device based on the at least one character identity attribute. Relevant character identity attributes may include, for example, a gender, an approximate age, an ethnicity, and/or an era in which the character identity exists. More specifically, voices stored in the storage device 109 may include or be associated with voice attributes (e.g., gender, approximate age, ethnicity, era, socioeconomic class, tribe, caste, dialect, level of education). The processor 305 may be programmed to select for suggestion voices having an attribute or attributes that match a particular character identity's attribute(s).

Alternatively, or in addition, the processor 305 may be programmed to collect a plurality of character identity-voice associations from a plurality of other user computing devices and provide a voice suggestion to the user computing device based on the collected character identity-voice associations. This method may be used to suggest character identity-voice associations based on the character identity-voice associations selected by other users.

The processor 305 is also programmed to provide one of the plurality of voices from the storage device 109 to the user computing device via the communication interface 315. For example, the processor 305 may receive a request for a voice from the user computing device. More specifically, the processor 305 may receive a purchase request for a voice from the user computing device, provide the voice to the user computing device, and charge a fee to an account associated with the user computing device.

In some embodiments, the processor 305 is operatively coupled to the storage device 109 via a storage interface 320. The storage interface 320 is any component capable of providing the processor 305 with access to the storage device 109. The storage interface 320 may include, for example, an Advanced Technology Attachment (ATA) adapter, a Serial ATA (SATA) adapter, a Small Computer System Interface (SCSI) adapter, a redundant array of inexpensive disks (RAID) controller, a storage area network (SAN) adapter, a network adapter, and/or any component providing the processor 305 with control over the storage device 109.

In one embodiment, the storage device 109 stores at least one written work having a plurality of character identities therein. The written work may be stored as text, with or without formatting, such that the processor 305 may easily parse the work. In text format, the work may take the form of a plain text file, electronic book (e-book), word processor document, or any other suitable format. Alternatively, the written work may be stored as scanned images from a physical copy of the work; in this scenario, prior to processing the written work, the processor 305 pre-processes the images using optical character recognition (OCR) software to produce parseable text.

Figure 4:
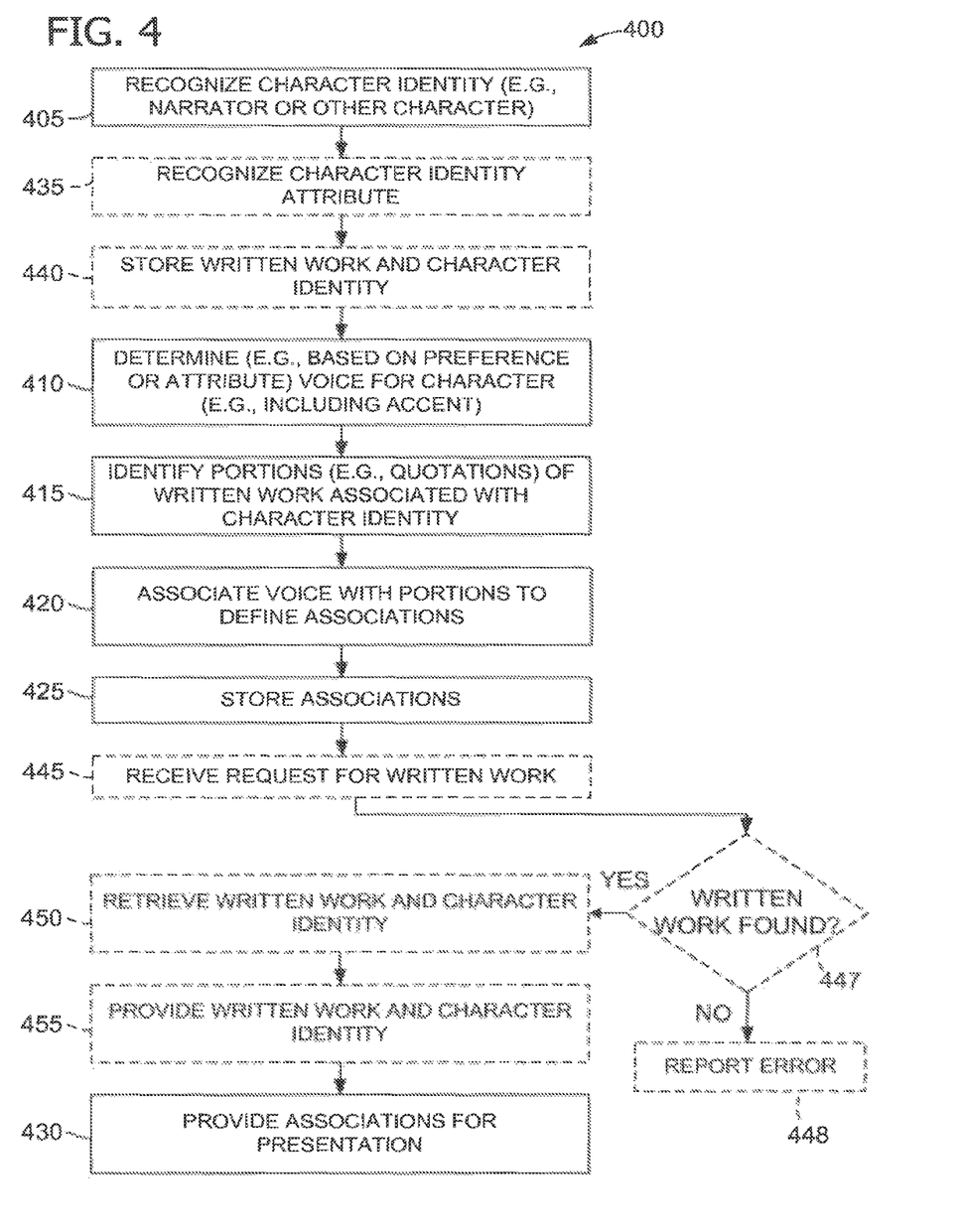
FIG. 4 is an exemplary flow chart for presenting a written work.

Referring next to FIG. 4, an exemplary flow chart 400 is provided for presenting a written work. A character identity is recognized 405 within a written work. A character identity may include a narrator or any other named or unnamed character identity. A voice is determined 410 for the character identity. In some embodiments, a user of the user computing device defines one or more preferences, such as a default voice for narrator character identities. A voice is determined 410 for the character identity based at least in part on the preference of the user. Any attribute that can be associated with a character identity may be associated with a narrator.

Further, determining 410 a voice may include determining an accent for the character identity based on an ethnicity of the character identity, a place of birth or residence of the character identity, an era or time period in which the character identity exists, and/or at least one quotation associated with the character identity (e.g., containing vernacular and/or slang terms). For example, a British accent may be selected for a character identity born in London or a character identity associated with a quotation containing the word "bloke". Similarly, a southern United States accent may be selected for a character identity associated with a quotation containing the contraction "y' all".

One or more portions of the written work associated with the character identity are identified 415. For example, quotations associated with the character identity may be identified. The determined voice is associated 420 with the identified portions to define one or more voice-portion associations. The voice-portion associations are stored 425 in a storage device. The voice-portion associations are provided 430 from the storage device to a user computing device for presentation of the identified portions using the determined voice.

In addition to recognizing 405 a character identity, one or more character identity attributes may be recognized 435. For example, a gender, an approximate age, an ethnicity, and/or an era in which the character identity exists may be determined. A voice may be determined 410 for the character identity based at least in part on the recognized character identity attribute(s). For example, a user may define a preference relating a voice to at least one character identity attribute.

In some embodiments, the written work and character identity (including attributes, if recognized) are stored 440 in the storage device. Later, a request for the written work is received 445 from the user computing device. The storage device is checked to determine 447 whether the written work can be found. If not, an error is reported 448. If so, the written work and character identity are retrieved 450 from the storage device and provided 455 to the user computing device.

Figure 5:
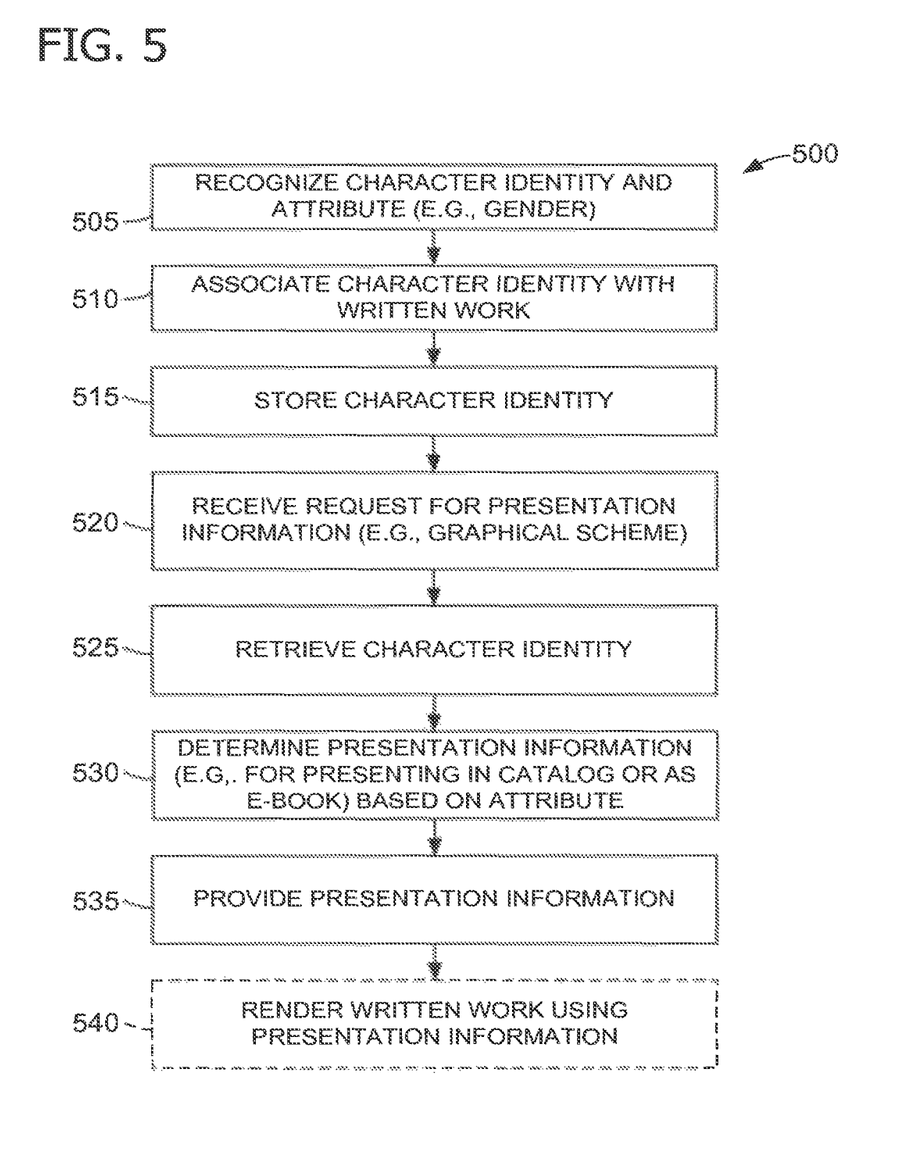
FIG. 5 is an exemplary flow chart for presenting a written work based on one or more character identity attributes.

Referring to FIG. 5, an exemplary flow chart 500 is provided for presenting a written work based on one or more character identity attributes. A character identity having at least one character identity attribute (e.g., gender, approximate age, ethnicity, and/or era in which the character identity exists) is recognized 505 within a written work. For example, an approximate age may be determined based on an explicit reference to a birth date, an age relative to another character identity (e.g., four years younger than a character with a known age), the date of a life event (e.g., a character identity's Bar Mitzvah ceremony), or one or more familial relationships. In some cases, such as when a birth date is provided, an exact age can be determined. In other cases, the information available provides for only an approximation of age. Where a written work contains a non-fictional character identity, one or more sources outside the written work may be consulted in determining an approximate age for the character identity.

The character identity is associated 510 with the written work and stored 515 in a storage device. A request for presentation information for the written work is received 520 from a remote device via a communication interface. The character identity is retrieved 525 from the storage device. Presentation information for the written work is determined 530 based on the at least one character identity attribute of the retrieved character identity. The presentation information for the written work is provided 535 to the remote device via the communication interface. The remote device renders the written work using the provided presentation information. Optionally, the written work is rendered 540 at the remote device using the presentation information.

In some embodiments, the presentation information includes information for presenting the written work in a catalog. For example, the presentation information may include a graphical scheme based on at least one character identity attribute of a character identity associated with the written work. A graphical scheme may include any graphical elements, including color, icons, graphics, photographs, and/or fonts. Graphical elements may be selected based on any character identity attributes, including gender, age, ethnicity, temperament, and/or personality. For example, an elegant script font may be selected for a gentle, feminine character identity, whereas a bold, block font may be selected for a gruff, masculine character identity.

In some embodiments, the presentation information includes a graphical scheme for displaying the written work in an electronic book format. For example, in either a catalog or an electronic book format, a colorful, informal graphical scheme may be selected for a children's book with a young character identity. Similarly, a graphical scheme may be applied to physical packaging for a written work (e.g., a cover for a book).

Figure 6:
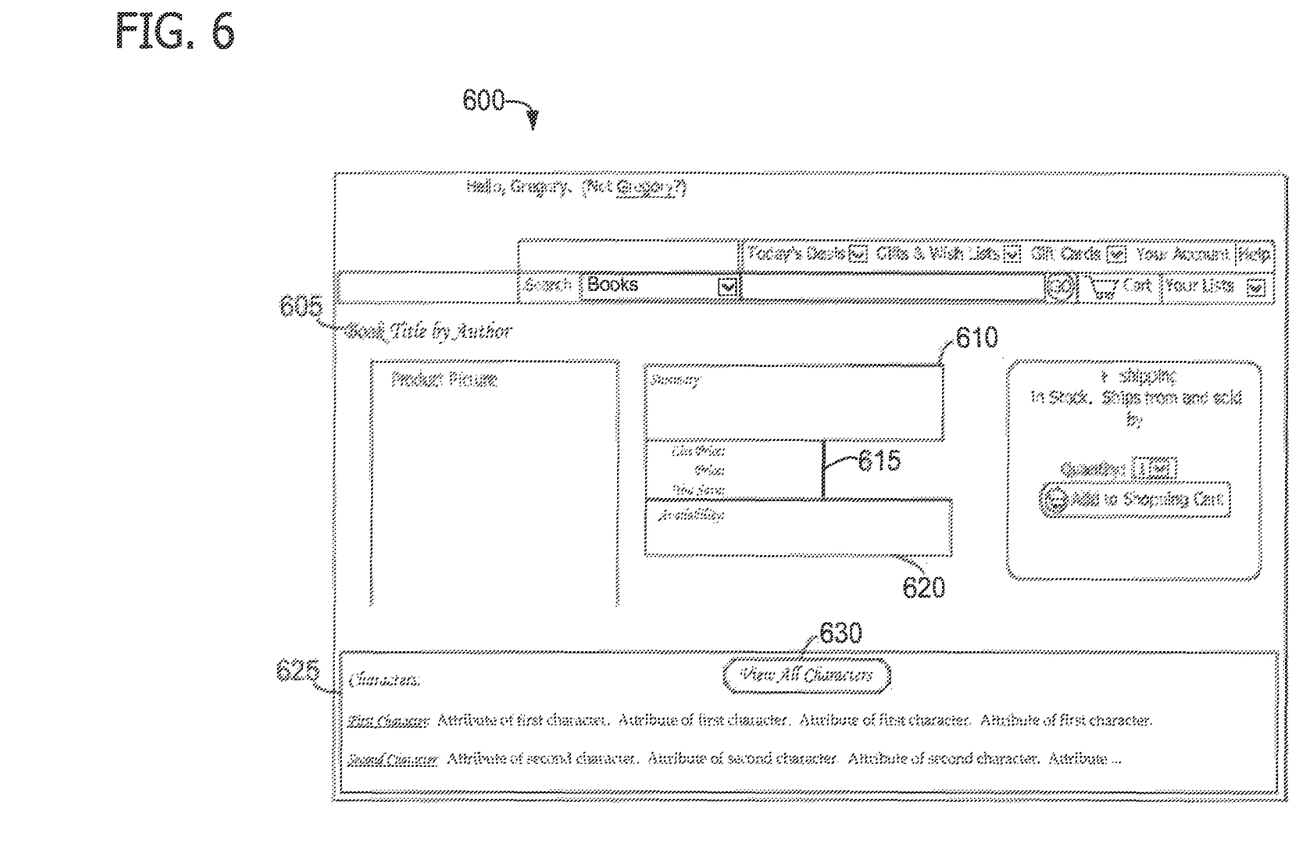
FIG. 6 is an example screen shot of a graphical interface for displaying written work information in a catalog.

Referring next to FIG. 6, a screen shot is provided of a graphical interface 600 for displaying written work information in a catalog. The graphical interface 600 includes information about a written work, including a title and author 605, summary information 610, pricing information 615, and availability information 620. The graphical interface 600 also includes a character identity information section 625 containing names and brief descriptions of character identities from the written work. The character identity information section 625 also includes a button 630 allowing a user to navigate to a page listing character identity information in more detail.

A literary classic graphical scheme is applied to the graphical interface 600. Specifically, the title and author 605, summary information 610, pricing information 615, availability information 620, and character identity information section 625 include text rendered in a formal script font. Character identity information section 625 also includes text rendered in a serif font, which is more formal than a sans-serif font, as is typically used in such graphical interfaces. Button 630 also includes text in a script font and has a formal, stylized shape. In addition to fonts and shapes, a graphical scheme such as the literary classic graphical scheme shown in FIG. 6 may include colors and/or any graphical feature suitable for written works associated with the graphical scheme.

Figure 7:
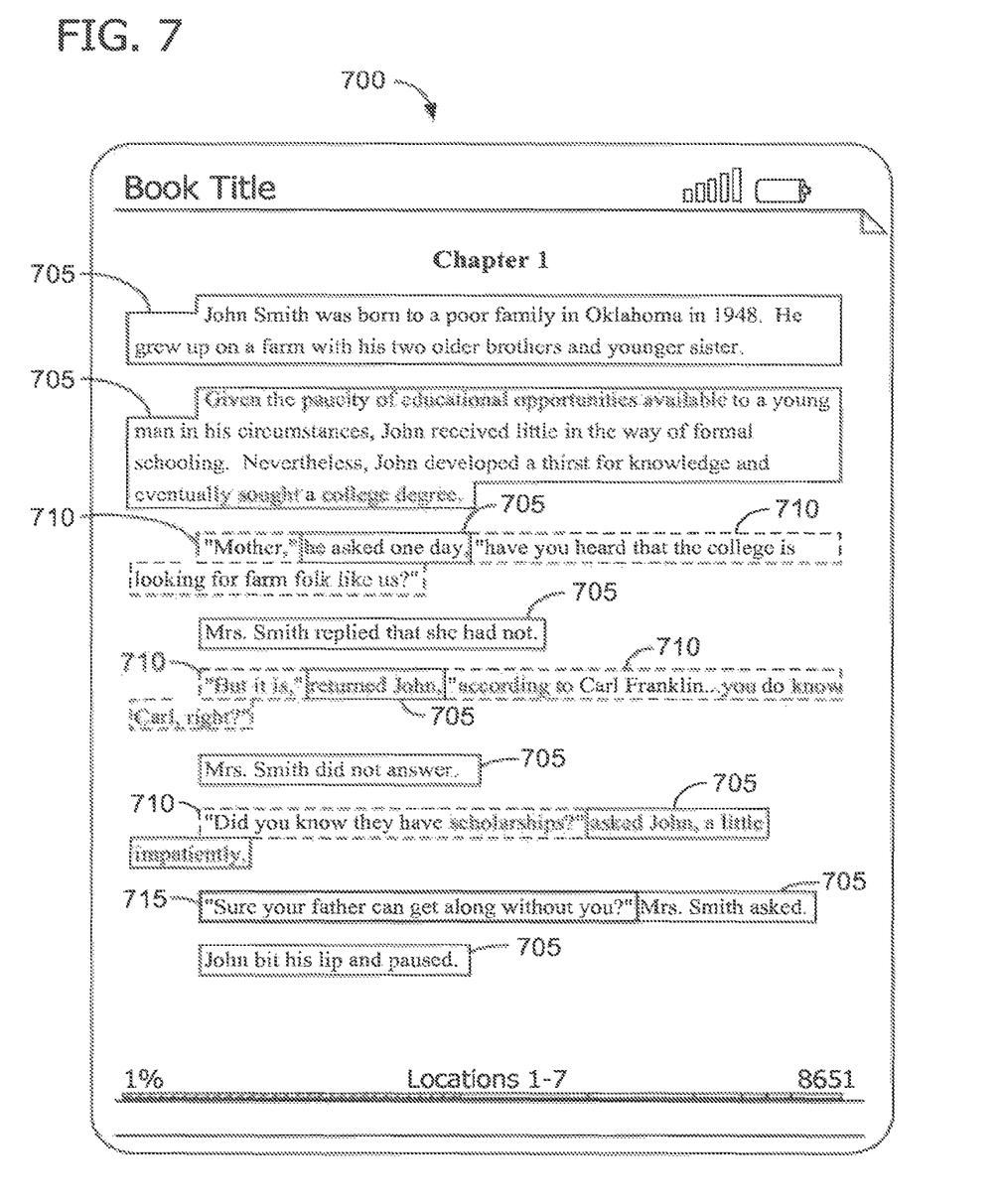
FIG. 7 is an example screen shot of a graphical interface for displaying content for a written work.

Referring next to FIG. 7, a screen shot is provided of a graphical interface 700 for displaying content for a written work. Specifically, the graphical interface 700 is an electronic book reader interface. The graphical interface 700 displays written work content including portions 705 associated with a narrator character identity, portions 710 associated with a second character identity, and a portion 715 associated with a third character identity.

The graphical interface 700 displays the portions 705, 710, and 715 using presentation information. Specifically, each of the character identities is associated with a graphical scheme for graphically distinguishing portions associated with one character identity from portions associated with another character identity. In the example of FIG. 7, portions for each character identity are highlighted in a manner unique to the character identity. Alternatively, or in addition, the graphical interface 700 may highlight or otherwise distinguish portions of the written work based on character identity attributes. For example, a single formatting may be applied to all female character identities between the ages of 5 and 10 years old.

Figure 8:
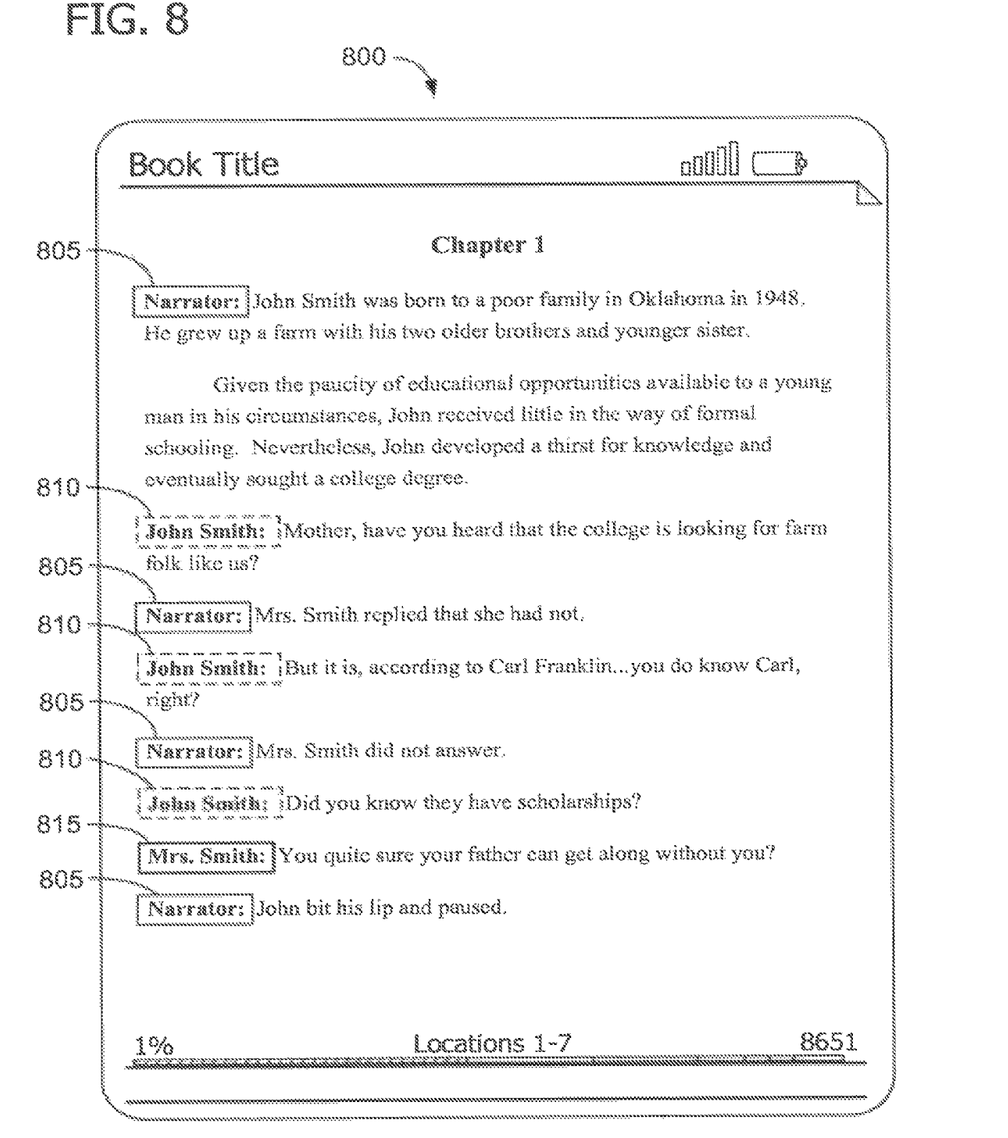
FIG. 8 is an example screen shot of a graphical interface for displaying a script based on a written work.

Referring to FIG. 8, a screen shot is provided of a graphical interface 800 for displaying a script based on a written work. In some embodiments, after portions associated with multiple character identities are identified, the portions may be arranged into a script. Graphical interface 800 illustrates the display of a script based on the content displayed in FIG. 7. Similar to graphical interface 700, graphical interface 800 includes portions 805 associated with a narrator character identity, portions 810 associated with a second character identity, and a portion 815 associated with a third character identity.

Arranging portions of a written work into a script may include removing short (e.g., fewer than three words, fewer than five words, or fewer than ten words) portions associated with a narrator character identity. For example, FIG. 7 includes the original text:

"But it is," returned John, "according to Carl Franklin . . . you do know Carl, right?"

As indicated in FIG. 7, the original text includes two portions 710 associated with the second character identity and one portion 705 associated with the narrator character identity. FIG. 8 illustrates the removal of the narrative portion to produce the following single portion 810 associated with the second character identity:

"But it is, according to Carl Franklin . . . you do know Carl, right?"

Removing a short narrative portion from the written work may render the script more readable for a user, especially where the narrative portion separates two portions associated with the same character identity.

In a graphical interface for displaying a written work, such as the graphical interfaces 700 and 800, a reference (e.g., a name) for a character identity or a portion of the written work associated with a character identity may be selectable by a user via an input device. In response to the selection of the reference or portion, the graphical interface may display a context menu containing actions available in connection with the corresponding character identity. For example, the context menu may allow the user to specify how to format (e.g., highlight) portions of the written work associated with the character identity, view information about the character identity, and/or view other written works associated with the character identity.

In some embodiments, users of multiple devices may view a single written work. Each user is allowed to select a character identity or set of character identity attributes. Each user's device highlights portions of the written work associated with the character identity selected by the user or associated with any character identity with attributes matching the character identity attributes selected by the user. Two or more users may thus read the written work as group, with each user speaking the portions highlighted on that user's device.

Figure 9:
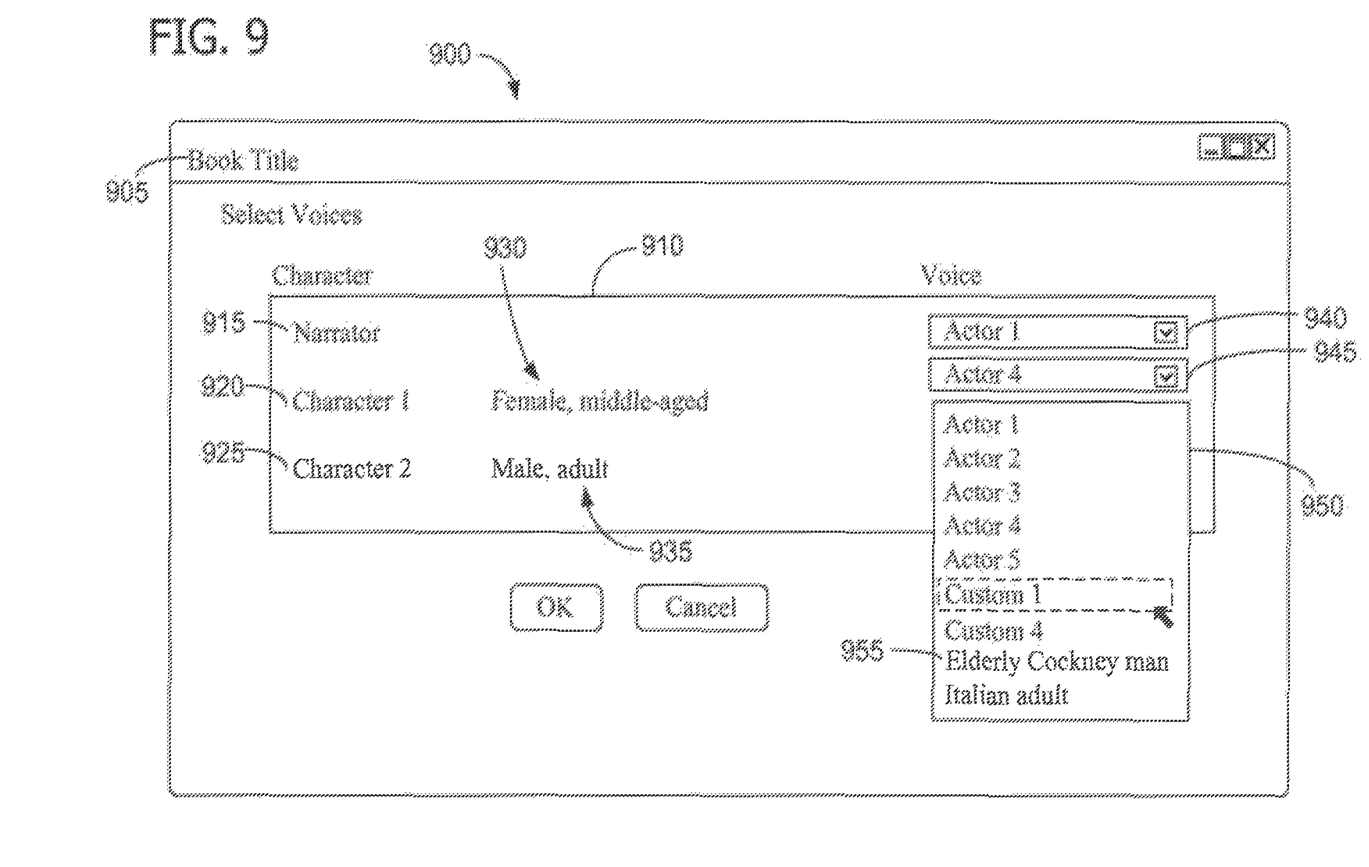
FIG. 9 is an example screen shot of a graphical interface for selecting a voice for a character identity in a written work.

Referring next to FIG. 9, a screen shot is provided of a graphical interface 900 for selecting a voice for a character identity in a written work. The graphical interface 900 includes a book title 905 and a table 910 of character identities associated with the book. In the example of FIG. 9, information for three character identities is provided in the table 910. Specifically, the table 910 includes a name 915 for a narrator character identity, a name 920 for a second character identity, and a name 925 for a third character identity. The table 910 also includes character identity attributes 930 for the second character identity and character identity attributes 935 for the third character identity. The table 910 also includes a voice selector 940 for the narrator character identity, a voice selector 945 for the second character identity, and a voice selector 950 for the third character identity.

The graphical interface 900 is displayed with the voice selector 950 expanded to reveal voices available for the third character identity. As shown, the voice "Actor 4" is selected in voice selector 945 for the second character identity. As indicated by the character identity attributes 930, the second character identity is a middle-aged woman. The voice selector 950 for the third character identity, which is an adult man, therefore does not include the voice "Actor 4". The voice selector 950 does, however, include other actor voices, custom voices, and voices with descriptive names such as voice "Elderly Cockney man" 955.

The graphical interface 900 may be used by a user of a user computing device at which a written work will be rendered. The user may specify default rules for selecting voices based on character identity attributes. For example, the user may specify that voice "Actor 1" be used for all male character identities over the age of 50 years old. For a newly obtained written work, therefore, the graphical interface 900 will indicate "Actor 1" for all male character identities over 50 years old. However, the user may override the default selections for one or more of the character identities. The user may also specify a default voice to be used for a narrator character identity in any written work.

The graphical interface 900 may also be used to define a default set or suggested set of character identity-voice associations to be provided to user computing devices. The default set or suggested set of character identity-voice associations may be stored by a server computing device so that it can later be retrieved for a user computing device. In some embodiments, a user of the user computing device is initially presented the graphical interface 900 with a voice selected for each character identity according to the default set or suggested set of character identity-voice associations. The user may override the default selections by manipulating one or more of voice selectors 940, 945, and 950.

In some embodiments, a user is presented with the graphical interface 900 at the time the user purchases a written work. The user may select from voices already stored in the user computing device and/or voices available for download—either freely or for purchase—from a remote device. If the user selects a voice available for purchase, the user computing device downloads the voice, and a fee is charged to an account associated with the user. The user may also select, download, and be charged for a voice after purchase.

A given character identity may appear in multiple written works, such as a series of novels. In such cases, it is contemplated that the corresponding character identity from each of the written works may be identified, and the resulting set of character identities and character identity attributes may be merged into a single character identity that is associated with all the corresponding written works. If the separate corresponding character identities were associated with other character identities (e.g., a child-parent relationship), the merged character identity may include all such associations. Further, if a voice has been associated with the character identity in one of the written works, but not in the other written work(s), the association of the character identity with the voice may be applied to the other written work(s).

Presentation information for audible presentation of a written work may include an indication of a time offset between portions. For example, in a case of alternating portions between two character identities (e.g., a quick exchange of dialogue), a relatively short time offset or even an overlap may be indicated. An interruption may be produced by indicating a negative time offset.

In one embodiment, character identity attributes are used to tailor advertising to meet the interests of individuals. Specifically, a customer profile is maintained by the operator of an online store for written works. The customer profile includes a purchase history of all written works purchased by the customer. The character identity attributes corresponding to the purchased written works are analyzed to determine a preferred set of character identity attributes for the customer. Other written works corresponding to character identity attributes that match the customer's preferred character identity attributes are recommended to the customer for purchase. Alternatively, or in addition, the customer profile includes demographic information such as a sex, an age, and/or a place of residence for the customer. Other customers having similar demographic information are identified to define similar customers. Character identity attributes occurring frequently in the purchase histories of the similar customers are analyzed to define a target set of character identity attributes. Written works corresponding to character identity attributes matching the target set of character identity attributes are recommended to the customer for purchase.

In another embodiment, an electronic catalog of written works is provided on a server computing device. The catalog provides a user of a user computing device the ability to search for written works by specifying one or more character identity attributes. The catalog returns to the user computing device only written works corresponding to the specified character identity attributes. The catalog may display with a written work the character identity attributes associated with the written work and/or other written works corresponding to at least some of the same character identity attributes.

In one embodiment, a director simulation is provided on a server computing device. The server provides to a user computing device one or more written works. A user of the user computing device selects a written work. The server computing device provides to the user computing device one or more character identities associated with the written work and, for each character identity, a plurality of real persons (e.g., actors and/or celebrities). The real persons may be provided based on one or more character identity attributes (e.g., age and/or gender). The user selects a real person for one or more of the provided character identities. The user may be presented an option to share the user's selections with others by transmitting a message via email or any other suitable form of communication and/or by publishing the user's selections to a social networking service.

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions embodied in one or more computer-executable components stored on one or more computer-readable media to implement aspects of the invention described and/or illustrated herein.

The embodiments illustrated and described herein as well as embodiments not specifically described herein but within the scope of aspects of the invention constitute exemplary means for identifying character identities in a written work.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a", "an", "the", and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
   identifying, by a computing device, a character identity in a work;
   generating, by the computing device, a voice that is related to the character identity, wherein the voice is associated with indicators within the work that suggest at least one of: a place that the character identity is from, a tribe of the character identity, a caste of the character identity, a dialect of the character identity, an education level of the character identity, an approximate age of the character identity, an ethnicity of the character identity, an era in which the character identity exists, or a socioeconomic class of the character identity;
   arranging, by the computing device, the work into a script such that an indicator of the character identity is followed by a portion of text associated with the character identity; and
   using, by the computing device, the voice to audibly present a portion of the work, wherein the portion is associated with the character identity.

2. The method of claim 1, wherein the voice is further based at least in part on a gender of the character identity.

3. The method of claim 1, further comprising: associating, with the character identity, a graphical scheme; and
   causing the portion of the work, wherein the portion is associated with the character identity, to be displayed utilizing the graphical scheme.

4. The method of claim 1, further comprising:
   receiving voice information for the voice, wherein the voice information is received from a remote computing device, wherein the remote computing device is associated with a user; and
   wherein the voice is audibly presented according to the voice information.

5. The method of claim 1, further comprising:
   receiving user input that identifies a voice to be associated with a particular type of character identity; and
   associating, with one or more character identities of the particular type of character identity, the voice identified to be associated with a particular type of character identity.

6. The method of claim 1, further comprising:
   determining, based at least in part on a quotation for the character identity, that the portion of the work is associated with the character identity.

7. The method of claim 1, wherein the indicators within the work comprise punctuation, diction, syntax, textual strings, or a combination thereof.

8. One or more non-transitory computer-readable media maintaining instructions that, when executed by one or more processors, cause the one or more processors to perform operations comprising:
   determining a character identity in a work;
   determining a voice for the character identity, wherein the voice is associated with indicators within the work that suggest at least one of: a place that the character identity is from, a tribe of the character identity, a caste of the character identity, a dialect of the character identity, an education level of the character identity, an approximate age of the character identity, an ethnicity of the character identity, an era in which the character identity exists, or a socioeconomic class of the character identity;
   arranging, into a script, the work such that an indicator of the character identity is followed by a portion of text associated with the character identity; and
   using the voice to audibly present a portion of the work, wherein the portion is associated with the character identity.

9. The one or more non-transitory computer-readable media of claim 8, wherein the character identity comprises a narrator for the work.

10. The one or more non-transitory computer-readable media of claim 8, wherein the work comprises a written work.

11. The one or more non-transitory computer-readable media of claim 8, wherein the determining the voice for the character identity includes determining an accent for the voice of the character identity.

12. The one or more non-transitory computer-readable media of claim 11, wherein the accent is determined based at least in part on content of a quotation, wherein the content is associated with the character identity.

13. The one or more non-transitory computer-readable media of claim 8, wherein the determining the voice for the character identity includes determining a speed at which the voice is to be audibly presented.

14. The one or more non-transitory computer-readable media of claim 8, wherein the determining the voice for the character identity includes determining a pitch at which the voice is to be audibly presented.

15. The one or more non-transitory computer-readable media of claim 8, wherein the operations further comprise:
receiving voice input from a user; and
creating, based at least in part on the voice input, the voice.

16. A system comprising:
one or more processors; and
memory communicatively coupled to the one or more processors and storing executable instructions that, when executed by the one or more processors, cause the one or more processors to perform operations comprising:
identifying a character identity in a work;
identifying a voice that is related to the character identity, wherein the voice is associated with indicators within the work that suggest at least one of: a place that the character identity is from, a tribe of the character identity, a caste of the character identity, a dialect of the character identity, an education level of the character identity, an approximate age of the character identity, an ethnicity of the character identity, an era in which the character identity exists, or a socioeconomic class of the character identity;
arranging, into a script, the work such that an indicator of the character identity is followed by a portion of text associated with the character identity; and
causing a portion of the work that is associated with the character identity to be output using the voice.

17. The system of claim 16, further comprising:
a media output component communicatively coupled to the one or more processors and configured to audibly output, using the voice, the portion of the work.

18. The system of claim 16, wherein the identifying the character identity comprises analyzing textual strings of the work, thereby identifying a textual string that refers to a character identity.

19. The system of claim 16, wherein the operations further comprise:
associating, with the character identity, a graphical scheme; and
causing the portion of the work, wherein the portion is associated with the character identity, to be displayed using the graphical scheme.

20. The system of claim 16, wherein the operations further comprise:
determining, based at least in part on a proximity of a quotation to a reference to the character identity, that the portion of the work is associated with the character identity.

21. The system of claim 16, wherein the operations further comprise:
causing the content of the work to be displayed.

* * * * *